United States Patent Office 3,483,735
Patented Dec. 16, 1969

1

3,483,735
PROCESS OF PRE-TESTING VESSELS AND THE LIKE FOR LEAKS
Joseph J. Packo, Fort Lauderdale, Fla., assignor to American Dynamics International, Incorporated, a corporation of Florida
No Drawing. Filed Dec. 28, 1967, Ser. No. 694,057
Int. Cl. G01m 3/04
U.S. Cl. 73—40.7          9 Claims

ABSTRACT OF THE DISCLOSURE

The invention relates to a process of pre-testing pipes, containers, vessels and the like for visually locating leaks, cracks, holes and fissures in such equipment. The interior of such equipment is filled with a gas containing an indicant agent, the interior is then sealed and a predetermined super-atmospheric pressure is maintained for a suitable period of time so that if any leak is present in the walls of the sealed equipment, the pressurized gas containing the indicant agent will escape into the atmosphere at such locus and the indicant present in the gas can be visually observed so as to precisely locate the leak. The indicant admixed with the gas may be a colored gas, a phosphorescent, fluorescent, or a pyrophoric agent. Such indicant agents upon escape into the atmosphere become visible as a color or smoke, or may be detected under ultraviolet light or by infrared detecting means.

Field of the invention

There are many advantages of this invention over the presently used methods for locating leaks. The greatest advantage is that without the use of sensor equipment or a trained technician an observer can detect the location of the leaks by merely visible observation, commonly known as "eyeballing." If micro-sized leaks are to be detected, I can further use infrared scanning equipment or infrared sensors to locate the general area of the leak and thus further pinpoint the micro-leak. However, in most cases where it is not mandatory to locate the micro-size leaks, they can be observed quickly and economically by a casual observer. If the pipe is hidden or buried under ground, infrared equipment can be used to locate the leak because some of the indicant compounds that are used according to this invention react exothermically upon escape into the air. This has a great advantage over other methods because leaks can be detected in the dark or in places not easily accessible.

Some of the utilizations of this invention are a pre-testing of pipe systems aboard ships. With my process an observer can almost walk through casually and immediately spot leaks by the location of the color or smoke-like vapor indicating the leak. It further can be used in aircraft pipe systems, hydraulic or gas systems. It can be utilized in pipelines for a pre-test prior to operation. It further can be used by plumbers that are "hooking up" a house or industrial system. It can also be used by building inspectors to check the tightness of systems within homes, industrial plants, etc. Another application of this invention is the periodic testing of piping systems such as operational missiles, pressurized telephone conduits. One of the major problems with telephone conduits is that should the existing gas that is put in the conduit escape undetected, moisture could then enter the cable and destroy the insulating property of the cable insulation. My process makes it possible for a quick, economical pre-testing of systems and periodic testing.

The prior art

It is significant that prior to this invention no one has

2 suggested the use of a visual indicant gas to pre-test for leaks in closed systems or containers. The present and common methods in use are the pressure test, hydrostatic testing, soap test, helium mass spectrometer, hydrogen and halide leak detectors.

Gaseous radioactive tracers have also been used to locate leaks in buried pipelines. Short half-life radioactive tracers have also been used in the conduct of flow efficiency tests on gas transmission piping, but these tracers have not been applied to the detection and location of leaks in gas transmission or distribution piping. The general disadvantage of tracer methods is that controlled injection of the tracer substance is required, an operation that presents many practical difficulties in gas distribution systems.

Newly laid distribution mains are commonly pressured with gas to test them for tightness prior to being placed in service. Leakage is often detected by the decline in the pressure in the mains as indicated by a recording pressure gage; the dragnet leak detector was developed to facilitate this type of leakage test.

The testing of pipelines is frequently a difficult and expensive task. For economic and safety reasons, pipelines must be leak-free. Hence, each pipeline must be tested for leaks at, or above, its expected operating pressure. In some situations, as in heavily populated areas or where it is required by local regulations, pipelines must be hydrostatically tested.

When a line is hydrostatically tested the presence of leaks is demonstrated by a drop in the line pressure. The location of particular leaks may be indicated by water shows. If a line under test is in an open ditch, leaking water can be easily seen in the bottom of the ditch. Many existing buried lines are tested and leaking water may, or may not, show at the surface of the ground.

In some formations water leaking out of a pipeline will drain down into the ground and will never show aboveground. In others, drainage may be lateral. In swampy areas, leaking water will just mix with the surrounding waters. From the foregoing, it may be seen that hydrostatic testing has some serious limitations.

The oldest and most common method for detecting leaks consists of applying externally a soap solution to the joint or to the point of the apparatus where a leak or crack is believed to be present, and simultaneously introducing a gas into the apparatus under pressure, The appearance of bubbles indicates a leak in the joint or the presence of a crack. The main drawback is that the bubbles have very short life, in the range of a few seconds, and may not be observed by the operator.

The soap test has many other serious limitations. It is necessary that each valve and joint be painted with soap or a chemical solution to detect leaks. In most cases it is difficult to get to "hard to get to places." Further, it is difficult to see leaks in the area away from the observer. Further limitations are that in a number of cases there are leaks in the pipe. Thus, it could only be discovered if the leak itself were pinpointed prior to the soap application.

Another method in detecting leaks is the use of hydrogen and helium that is put in the pipeline under pressure and would necessitate the observer to slowly scan the pipe and all the fittings with sensor equipment. This, too, has many serious limitations because there are many areas and surfaces that the observer or technician cannot get to in order to isolate the leak.

Winter et al. in Ind. Eng. Chem. 50, No. 5, 53A (1958) reviewed the established methods for detecting leaks in process equipment. The radioactive tracer method is expensive since it involves the use mainly of radioactive phosphorous. The infrared leak detector is based on the use of nitrous oxide and detection of the leak as the gas escapes. The halide torch method utilizes a halide torch for detecting a leak, and necessitates the introduction of both Freon and air within the apparatus. Other methods are essentially based on the color change of different indicators.

Summary of the invention

According to the present invention, pipes, containers, closed systems and the like which are intended to contain fluids therein are pre-tested under static or dynamic pressures for leaks which may exist in such items either in the walls thereof or at the joints or connections of process systems in pipelines. A selected indicant carried in a gas vehicle is pumped into the closed or sealed item to be pre-tested for leaks. A predetermined pressure is maintained for a suitable time in the interior of such items, and if any leaks are present the admixed gas and indicant upon escape into the atmosphere will produce a colored smoke which can be observed visually, or when using selected indicants by means of infrared equipment for detecting leaks in the dark. Selected sections of a pipeline or system may be closed off and tested for leaks in the same manner.

The object of this invention is to visually identify and locate leakage points in a system or container that normally cannot be determined until the system is operating, carrying or containing that material for which it was designed. This invention relates to pre-testing process for visually identifying any existing leak points, such as the pre-testing of aircraft systems, ship systems, missile systems; gas or liquid systems, such as transmission, distribution lines; pre-testing submarine systems containing gas or liquid; pre-testing of cryogenics containers and transmission lines and the like.

A further object of this invention is to pre-test a ship before a "shake down" cruise in order to eliminate many leaks that normally can be repaired in port, saving time and money. This process has a broad spectrum of utility in pre-testing for leakage in missile equipment, aircraft systems, leakage pre-testing of gas and liquid lines, chemical lines and containers.

This invention also contemplates the use of fluorescent, phosphorescent, pyrophoric or inflammable indicant agents. Various other agents may be added to gases or liquids so as to produce a visible colored smoke or indicant in order to pinpoint the leaks. In the dark it would be desirable to use phosphorescent or fluorescent agents in order to be seen. It may be desirable to use a pyrophoric agent in order to use infrared equipment to detect leaks that cannot be readily seen by the eye.

Description of preferred embodiments

This invention provides a simple means for detecting pipe and container leaks by admixing a coloring or indicant agent to a selected vehicle gas. When such colored gas or indicant agent is pumped into a pipe system or container under various selected pressure, any leaks which may develop are readily and immediately detected visually by the escaping test gas containing an indicant without requiring any special equipment. In order to color any given gas or mixture of gases, I add a selected indicant agent which may be an inorganic or organic agent and which is stable and non-reactive with the vehicle gas. A sufficient amount of the indicant agent is added so that the test gas will be visible to the eye upon escape into the atmosphere. Pressures which are applied to the interior of the vessels and the like to be pre-tested for leaks may vary from slightly above atmospheric pressure to several hundred atmospheres depending upon the character of the vessels being pre-tested, the working pressures under which they may be normally operated, and the character of the leaks to be detected. In the case of relatively large leaks only moderate pressures are necessary to locate them, but as the leaks approach micro-size increasingly greater pressures will be required in order to locate them. The pre-testing pressures may also be maintained at a predetermined level for a suitable period of time or may be progressively increased to specific levels.

I may also add to a selected vehicle gas such as nitrogen, for example, diazomethane, which is yellow gas, under normal conditions in an amount from 10 to 20% by volume to give a distinctive color upon escape into the atmosphere. Other colored gases which may be used in suitable amounts are chlorine monoxide, a yellow-red gas; chlorine dioxide, a reddish-yellow gas; dinitrogen trioxide, a reddish-brown gas; nitrogen trioxide, a bluish gas; nitrosyl bromide, a brownish gas; nitrosyl chloride, a yellow gas; nitryl chloride, a pale yellow-brown gas; nitrogen dioxide or tetroxide, a reddish-brown gas. To vehicle gases may also be added elemental chlorine which is a greenish gas, or elemental bromine, which is a brownish-red gas, in order to impart color to the gas. These indicant agents must of course be used in compatible environmental conditions which one skilled in the art can readily determine so that the added colored gases will not corrode or react with the equipment receptacle or conduit being tested for leaks. The vehicle gas should of course also be non-reactive with the added chlorine or bromine. A suitable reactive agent may also be added to a selected vehicle gas which is to be colored, so that the added agent will react with all or a portion of the gas, so as to color the gas.

An indicant agent, such as titanium tetrachloride or stannic chloride, which will produce a visible smoke upon escape into the atmosphere, may be also added to vehicle gases in accordance with this invention. Also pyrophoric substances may be used which will spontaneously react with oxygen in air and produce a visible smoke when they escape into the atmosphere, such as, for example, dimethyl arsine, boron hydride, and phosphine.

Vapors of phosphorus which upon escape into the atmosphere may phosphoresce in the dark, may also be used as an indicant agent. Also, naphthalene or metallic mercury vapors may be added to various gases so that they will fluoresce under ultraviolet light.

According to this invention, particularly suitable indicant agents are selected normally gaseous or volatile metal hydrides, metal alkyls, metal alkyl halides, and metal alkyl hydrides. These agents are added to a non-reactive vehicle gas, such as hydrogen, helium or nitrogen in amount so that upon escape of the admixed test gas into the normal atmosphere a visible signal or smoke will be produced. These added indicants are preferably substances which are easily volatilized and which can be admixed with the vehicle gas and carried along with the gas in the equipment being tested. If a leak develops the added agent upon escape into the atmosphere reacts with the oxygen and/or moisture in the air to produce a visible smoke.

Agents suitable for admixing with vehicle gases may be selected silicon hydrides and boron hydrides. The agents may also be compounds having the general formula:

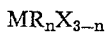

$$MR_nX_{3-n}$$

wherein M is aluminum or boron; R is an aliphatic or olefinic straight chain, branched chain or cyclic organic group having 1 to 10 carbon atoms; X is hydrogen or a halogen selected from the group of chlorine, bromine, iodine and fluorine; and $n$ is an integer of at least 1.

Specific illustrative agents are triethyl aluminum, ethyl aluminum sesquichloride, diethyl aluminum chloride ethyl aluminum dichloride, diisobutyl aluminum chloride, monoisobutyl aluminum dichloride, triisobutyl aluminum, aluminum diethyl hydride, methyl aluminum sesquichloride, diisobutyl aluminum hydride, triisohexyl, aluminum, tri-n-hexyl aluminum, tri-n-octyl aluminum, tri-n-butyl aluminum, tri-n-decyl aluminum, aluminum isoprenyl, tri-n-propyl aluminum, triisopropyl aluminum, tri-n-butyl aluminum, and tricyclohexyl aluminum. Boron compounds analogous to the aforementioned aluminum compounds may be used such as boron triethyl, boron diethyl bromide, etc.

Other suitable agents may be compounds having the formula:

$$ZR_nX_{2-n}$$

wherein Z is zinc or cadmium; R is an aliphatic straight chain, branched chain or cyclic organic group having 1 to 10 carbon atoms; X is hydrogen or a halogen from the group of chlorine, bromine, iodine and fluorine; and $n$ is an integer of at least 1.

Illustrative specific compounds are diethyl zinc, di-n-butyl zinc, diethyl cadmium, diisobutyl cadmium, dioctyl zinc, and dicyclohexyl zinc.

These agents may be added to vehicle gases in concentrations ranging from about 0.01 to about 10% by weight in the gases. They may also be conveniently added in solutions of suitable hydrocarbons, such as butane, hexane, heptane, etc. which will uniformly volatilize or disperse in the vehicle gas. When the admixed gases escape into the atmosphere they produce a visible smoke. Also when the admixed test gases escape into the atmosphere these metal organo indicant agents react exothermally with the oxygen in the atmosphere to develop heat which can be detected by infrared photography in the dark. A mixture of 85% triethyl borane and 15% diethyl zinc has been found suitable for admixture with helium, hydrogen or nitrogen gas in amounts 0.05 to 25%. A hydrocarbon solution containing 25% by weight triethyl aluminum containing a trace of diethyl zinc may also be added to a vehicle gas and volatilized therein for detecting leaks.

When an indicant is used which is pyrophoric in the normal atmosphere it is necessary to use a non-reactive or inert vehicle gas. In such cases the air or other fluid present in the vessel to be pre-tested is first completely purged or flushed out with an inert gas, such as nitrogen, hydrogen, helium or carbon dioxide and a selected non-reactive indicant or mixture of indicants is then added in predetermined amount through a suitably connected inlet. The indicant is admixed with the gas in the interior of the vessel so that the indicant is uniformly distributed therein and the vessel is then sealed. A predeetermined superatmospheric pressure is then maintained in the interior of the vessel and the escape into the atmosphere of the indicant at the locus where a leak may exist can be observed visually. When using an indicant which is not reactive with air, the indicant can be simply introduced into the sealed interior of the vessel and the like in suitable amount.

It is apparent that other specific indicant agents having the properties previously described may be readily selected in the light of the teaching of this invention for admixing with the vehicle gases.

The expression "vessel and the like" used in the appended claims is intended to include pipes, conduits, containers, tanks, vessels, and closed systems having spaces for containing fluids therein.

I claim:

1. The process of locating leaks in a vessel and the like for containing a fluid which comprises the steps of purging said vessel with an inert gas, filling said vessel with a gas containing an indicant which reacts with the atmosphere to produce a visible signal, sealing said vessel, maintaining a predetermined superatmospheric pressure in the interior of said vessel and observing the escape into the atmosphere of said indicant at the locus of said vessel where a leak is present.

2. The process of claim 1, wherein the indicant agent is a pyrophoric gas.

3. The process of claim 2, wherein the pyrophoric gas is dimethyl arsine, phosphine or boron hydride.

4. The process of claim 1, wherein the indicant agent is a volatilized fluorescent agent.

5. The process of claim 1, wherein the indicant agent is a normally gaseous or volatile compound selected from the group consisting of silicon hydrides and boron hydrides; a compound having the formula:

$$MR_nX_{3-n}$$

wherein M is aluminum or boron; R is an aliphatic or olefinic straight chain, branched chain or cyclic organic group having 1 to 10 carbon atoms; X is hydrogen or a halogen selected from the group of chlorine, bromine, iodine and fluorine; and $n$ is an integer of at least 1; and a compound having the formula:

$$ZR_nX_{2-n}$$

wherein Z is zinc or cadmium; R is an aliphatic straight chain, branched chain or cyclic organic grouping having 1 to 10 carbon atoms; X is hydrogen or halogen from the group of chlorine, bromine, iodine and fluorine; and $n$ is an integer of at least 1.

6. The process of claim 5, wherein the indicant agent comprises triethyl aluminum, triethyl borane, diethyl zinc or ethyl aluminum sesquichloride.

7. The process of locating leaks in a vessel and the like for containing a fluid which comprises the steps of purging said vessel with an inert gas containing an indicant, said indicant agent being selected from the group consisting of diazomethane, chlorine monoxide, chlorine dioxide, dinitrogen trioxide, nitrogen trioxide, nitrosyl bromine, nitrosyl chloride, nitryl chloride, nitrogen dioxide, nitrogen tetroxide, bromine and chlorine, sealing said vessel, maintaining a predetermined superatmospheric pressure in the interior of said vessel and observing the escape into the atmosphere of said indicant at the locus of said vessel where a leak is present.

8. The process of locating leaks in a vessel and the like which comprises the steps of purging the interior of said vessel with an inert gas, admixing an indicant agent with said gas until the indicant agent is uniformly distributed therein, said indicant reacting with the atmosphere to produce a visible signal, sealing said vessel containing said indicant agent, and maintaining a predetermined superatmospheric pressure in the interior of said vessel and observing the escape into the atmosphere of said indicant agent at the locus of said vessel where a leak is present.

9. The process of locating leaks in a vessel and the like which comprises the steps of flushing out all the air present in the interior of said vessel with an inert gas containing an indicant reacting with the atmosphere to produce a visible signal, sealing said vessel while filled with said gas, and maintaining a predetermined superatmospheric pressure in the interior of said vessel and observing the escape into the atmosphere of said indicant at the locus of said vessel where a leak is present.

References Cited

UNITED STATES PATENTS

| | | | |
|---|---|---|---|
| 3,003,349 | 10/1961 | Sullivan et al. | 73—40.7 |
| 3,085,423 | 4/1963 | Champion | 73—40.7 XR |
| 3,174,329 | 3/1965 | Kauffman et al. | 73—40.7 |
| 3,186,214 | 6/1965 | Roberts | 73—40.7 |
| 3,234,045 | 2/1966 | Larsen | 73—40.7 XR |

FOREIGN PATENTS 44,764   6/1960   Poland.

LOUIS R. PRINCE, Primary Examiner

JEFFREY NOLTON, Assistant Examiner

U.S. Cl. X.R.

23—230; 252—408